United States Patent [19]
Chlanda et al.

[11] 3,787,304
[45] Jan. 22, 1974

[54] PRODUCTION OF HF FROM FLUORINE BY-PRODUCTS

[75] Inventors: Frederick P. Chlanda, Rockaway; Kang-Jen Liu, Somerville, both of N.J.

[73] Assignee: Allied Chemical Corporation, New York, N.Y.

[22] Filed: Jan. 31, 1972

[21] Appl. No.: 222,013

[52] U.S. Cl. ............... 204/180 P, 204/94, 204/103, 204/128
[51] Int. Cl. ............................................ B01d 13/02
[58] Field of Search.. 204/180 P, 128, 103, 101, 94; 423/464, 465

[56] References Cited
UNITED STATES PATENTS
2,829,095  4/1958  Oda et al. .................... 204/180 P X
3,450,609  6/1969  Carlin ................................ 204/103

Primary Examiner—John H. Mack
Assistant Examiner—A. C. Prescott
Attorney, Agent, or Firm—Arthur J. Plantamura et al.

[57] ABSTRACT

Fluorine values are recovered from fluosilicic acid aqueous streams by electrodialytic water-splitting of fluoride salt to hydrofluoric acid and hydroxide base and further optionally concentration of the hydrofluoric acid via membrane electro-dialysis, to produce anhydrous HF.

5 Claims, 2 Drawing Figures

PRODUCTION OF HF FROM FLUORINE BY-PRODUCTS

BACKGROUND OF THE INVENTION

In a number of industrial processes, fluorine values in dilute aqueous streams are often discarded because no economically practical process is available for recovery. The present invention is directed to a novel and advantageous process for the recovery of such fluorine values. One such process, which will be described specifically, as illustrative, relates to the manufacture of phosphoric acid.

When phosphate rock is treated with a strong acid, such as sulfuric acid in the industrial manufacture of phosphoric acid, silicon tetrafluoride; which is normally hydrolyzed to fluosilicic acid, is evolved as a by-product. Although this by-product contains valuable fluorine, it has been regarded as a waste material because only limited commerically feasible methods are known for converting it into a more valuable fluorine-containing compound.

A particularly valuable fluorine-containing compound is anhydrous hydrogen fluoride, and several methods have been proposed for recovering hydrogen fluoride such as from ammonium bifluoride, which is readily obtained in accordance with well known methods from silicon tetrafluoride or fluosilicic acid by reaction with aqueous ammonia to produce ammonium fluoride followed by conversion of the ammonium fluoride to ammonium bi-fluoride. Illustrative of methods for producing hydrogen fluoride from ammonium bifluoride are those in U. S. Pat. Nos. 3,316,060; 3,128,152; 3,401,015; 3,455,650 and 3,501,268.

It is an aim of this invention to provide a novel and improved process for producing anhydrous hydrogen fluoride from relatively dilute aqueous streams containing fluoride values utilizing electrodialytic water-splitting and concentration of the hydrofluoric acid, and in a particular embodiment it is the purpose of the invention to produce hydrogen fluoride from by-products derived in the manufacture of phosphoric acid.

SUMMARY OF THE INVENTION

In accordance with a specific embodiment of the invention, anhydrous hydrogen fluoride is derived from the exit gases of phosphate manufacture. The fluorine values in the exit gases of phosphate manufacture are collected as a fluosilicic acid or a fluosilicate salt which is purified and converted to fluoride salt used to produce hydrofluoric acid and aqueous hydroxide base in an electrodialytic water-splitter. The hydrofluoric acid produced is subsequently concentrated by electrodialysis to a concentration above the azeotrope to permit recovery of anhydrous hydrofluoric acid by distillation. The following reactions illustrate the process:

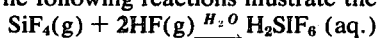
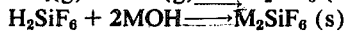
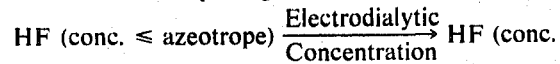
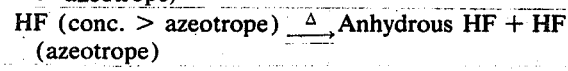

An advantageous feature of the process of the invention resides in the fact that fluorine values may be recovered as anhydrous hydrogen fluoride from dilute solutions without the necessity of evaporating large amounts of water or using expensive scrubbers. Another advantageous feature of the process of the invention is that no raw materials are required except those in the gases exiting from the phosphate plant and a small amount of make-up hydroxide base. With appropriate controls, the amount of waste that must be treated may be reduced 100 times compared to that which exits from existing phosphate plants and may be eliminated completely by recycle to the phosphate plant.

DESCRIPTION OF THE PREFERRED EMBODIMENTS

Figure 1:
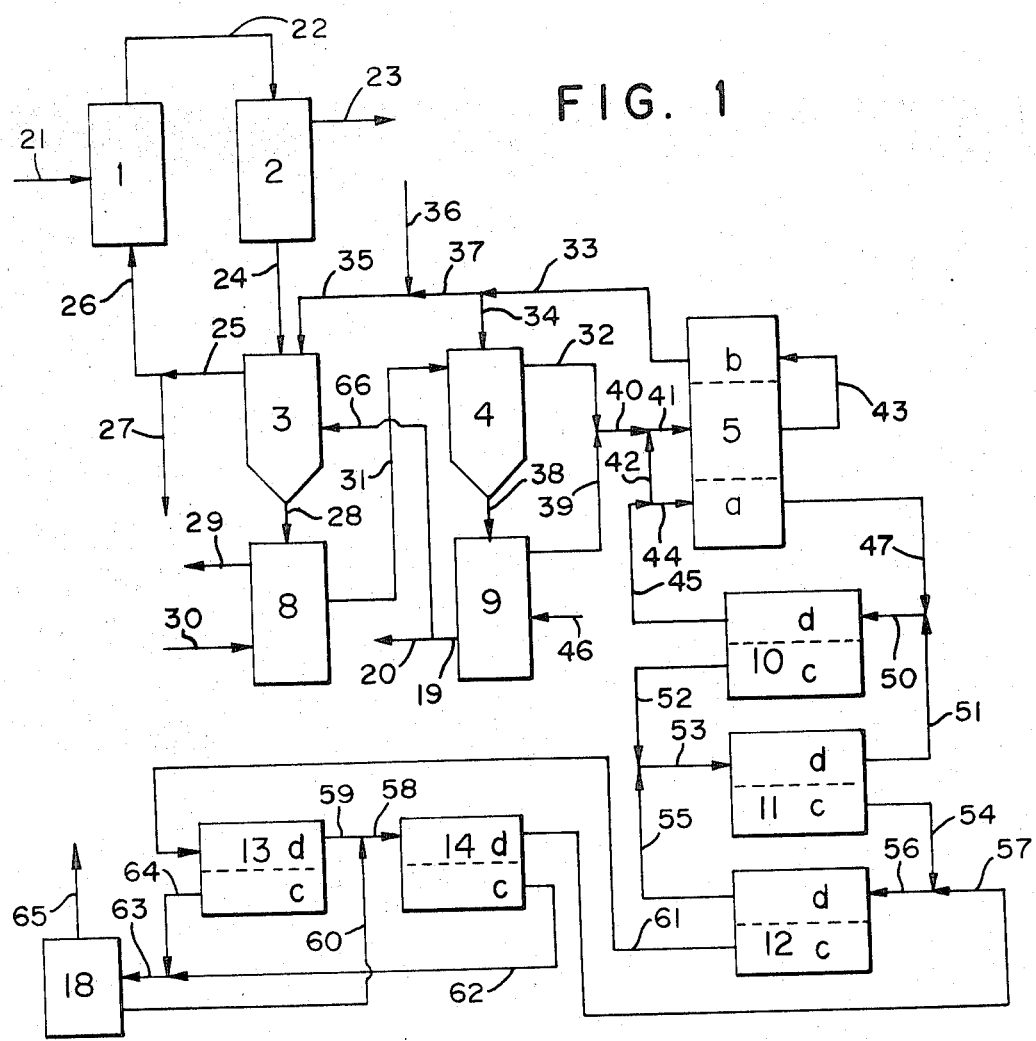
FIG. 1 is illustrative of flow diagram of the process in which fluorine values in fluosilic acid are converted to anhydrous hydrogen fluoride making use of electrodialytic water-splitting and concentration.

Description of the process of the invention is made with reference to the drawing using potassium salts as an example. As shown in FIG. 1, the vapors (hydrogen fluoride, silicon tetrafluoride, water, and phosphate) from the digester and evaporator of the phosphate plant enter barometric condenser 1 at 21, are dissolved in stream 26 and exit in solution from condenser at 22. Stream 22 passes into cooling tower 2 and exits at 24. Stream 23 consists of water lost by evaporation in cooling tower 2. Stream 24 containing fluosilicic acid, potassium, fluosilicate, phosphate, and silica passes into settler 3 where an aqueous potassium hydroxide/potassium fluoride mixture 35 and $SiO_2$ in stream 66 are added to precipitate potassium fluosilicate. The supernatant from the settler exits at 25. A small portion of stream 25 is bled into stream 27 and the remainder is returned to barometric condenser 1 in stream 26. The precipitate slurry (potassium fluosilicate) in settler 3 is removed in stream 28 to filter 8. Water is introduced in stream 30 to wash the precipitate free of phosphate. The wash water exits in stream 20 to waste or reclamation while the phosphate-free potassium fluosilicate slurry exits in stream 31 and is introduced into mixer-settler 4 with the potassium hydroxide/potassium fluoride mixture in stream 34. The potassium fluosilicate reacts in mixer-settler 4 to produce potassium fluoride which exits in stream 32 and silica which exits in stream 38 to filter 9. Water in stream 46 is introduced into filter 9 to wash the silica free of potassium fluoride. The wash solution, stream 39, containing potassium fluoride is joined with stream 32 to give the combined stream 40. The silica from filter 9 exiting as stream 19 is divided into stream 66 for addition to mixer-settler 3 and stream 20 for recovery or disposal. Stream 40, a potassium fluoride solution, is combined with a small amount of hydrofluoric acid, stream 42, recycled from the concentration process and admitted to the salt portion 55 of the water-splitting unit 5 as stream 41.

The electrodialytic water-splitting unit resembles an electro-dialytic concentration unit of conventional configuration wherein a large number of membranes are arranged between an anode and a cathode. The membranes are of three types: anion-permeable, cation-permeable, and bipolar. The bipolar membrane in essence consists of anion-permeable and cation-permeable sides separated by a thin layer of water. In the electrodialytic water-splitting apparatus, the cation-permeable side faces the cathode and the anion-permeable side faces the anode. Because of the perm-selectivity of the membranes comprising the bipolar membrane, when a direct current of electricity is passed through the membrane, the ions of any salt present in the thin layer of water separating the two membranes are quickly removed leaving only the hydrogen and hydroxyl ions from the dissociation of water to carry the current. Under the influence of the electric current, the hydrogen ions move toward the cathode through the cation-permeable side of the bipolar membrane while the hydroxyl ions move toward the anode through the anion-permeable side of the bipolar membrane. Adjacent to the cation-permeable side of the bipolar membrane is an anion-permeable membrane and adjacent to the anion-permeable side of the bipolar membrane is a cation-permeable membrane. The water-splitting process is accompanied by the migration of anions and cations of a salt solution contained in the compartment formed by the anion- and cation-permeable membranes to the compartments adjacent to the bipolar membrane. It is seen thus that in the compartment formed by the cation-permeable membrane and the anion-permeable face of the bipolar membrane a solution of the base of the salt cation is produced while in the compartment formed by the cation-permeable face of the bipolar membrane and the anion-permeable membrane a solution of the acid of the salt anion is produced. The electrodialytic water-splitting apparatus consists of end-plates, gaskets, spacers, ports, and membranes. The end-plates, to which inert electrodes are mounted, have channels providing flow to the cell and serve to clamp other components of the unit into place upon assembly. The gaskets of a soft, inert material form the solution chambers of the unit and are of such a configuration that holes and channels through them form manifolds for the distribution of the three solutions: acid, base and salt, to the appropriate compartments. The spacers, typically polypropylene mesh, serve to keep the membranes from touching. The ports fit into slots in the gaskets and help distribute the flow of solution in each compartment and provide a tight seal between adjacent compartments. In addition to the electrodialytic water-splitting unit, pumps, tanks and a direct-current source are required to perform the water-splitting operation.

Referring again to the drawing, the depleted salt solution exiting from 5 at 43 serves as the feed for the base section 5b of the water-splitting unit 5. Base produced in section 5b of water-splitting unit 5 exits at 33 and a portion of stream 33 is introduced as stream 34 into mixer-settler 4 and the remainder, stream 37, and a small amount of make-up potassium hydroxide, stream 36, is added to mixer-settler 3 as stream 35.

Hydrofluoric acid produced in acid section 5a of water-splitter unit 5 exits at 47, is combined with stream 51 to form stream 50, and passes to dilute section d of electrodialysis unit 10. This electrodialysis unit, as well as units 11, 12, 13 and 14, may be of conventional design as those commerically available from Ionics Inc. or Asahi Glass Company. The depleted hydrofluoric acid solution exits from unit 10 as stream 45. Concentrated hydrofluoric acid exits from the concentric portion c of electrodialysis unit 10 as stream 52, which stream, combined with stream 55, forms stream 53 which feeds the dilute portion d of electrodialysis unit 11. This stream, depleted of hydrofluoric acid, exits from electrodialysis unit 11 as stream 51. The concentrate produced in part c of electrodialysis unit 11 eixts as stream 54. Stream 54 is combined with stream 57 to form stream 56 which feeds the dilute portion d of electrodialysis unit 12 and exits as a stream 55 relatively depleted of hydrofluoric acid. The concentrate produced in part c of electrodialysis unit 12 exits in stream 61 and feeds the dilute portion d of electrodialysis unit 13. The depleted dilute solution from portion d of unit 13 exits in stream 59 and is combined with stream 60 to form stream 58 which provides the feed for the dilute section d of electrodialysis unit 14. The depleted solution from part d of unit 14 exits in stream 57. The concentrate produced in part c of electrodialysis unit 13 exits in stream 64 and the concentrate produced in part c of electrodialysis unit 14 exits in stream 62. These two streams are combined to form 63 which is admitted to still 18. Anhydrous hydrogen fluoride from still 18 exits in stream 65, while azeotrope from the still exits as stream 60, which is returned for further concentration.

The process may be modified by using equipment other than that specified to perform similar operations, e.g., substitution of centrifuges for filters, and by addition of equipment such as heat exchangers and holding tanks that may prove necessary under certain conditions of operation. The addition of water to the system at various points may also be necessary to maintain a proper water balance in operation.

The invention, therefore, involves essentially the removal of fluoride values from the exit gases of phosphate manufacture by precipitation of the saturated or oversaturated fluosilicate salt, purification and conversion of this salt to a fluoride by reaction with base, conversion of the fluoride salt to a hydroxide base and hydrofluoric acid by electrodialytic watersplitting, concentration of hydrofluoric acid by electrodialysis to concentration greater than the azeotropic concentration, and liberation of anhydrous hydrofluoric acid from this solution by distillation.

While all these steps are described, the rest are valid even though one may be replced by some other process. Thus, the process would still be applicable if KF or some other fluoride salt were obtained by some process other than that outlined.

Figure 2:
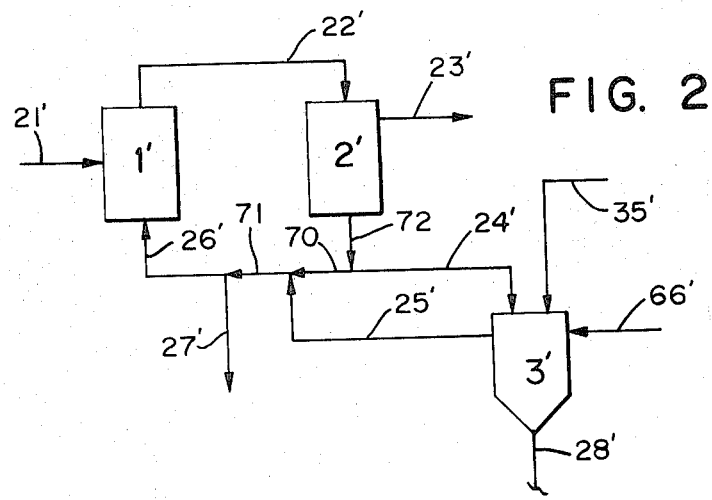
FIG. 2 is a partial flow diagram illustrating an alternate means for concentrating the flouride values before conversion to hydrogen fluoride.

The process illustrated in the drawing is for the purpose of illustrating the principles of the invention. It will be understood that it may be modified in actual operation to adapt to the particular demands or conditions at the site of operation. Thus, for example, it may be advantageous under some circumstances to use the operation detailed in FIG. 2 where the streams labeled with primed reference numerals serve the same function as their numerical counterparts in FIG. 1, but wherein only a small portion of stream 72 is removed as stream 24' for introduction into mixer-settler 3. The net effect of such operation is that a higher concentration of fluosilicic acid is circulated through the barometric condenser 1 and cooling tower 2 and the water introduced into mixer-settler 3 in stream 24' as illustrated in FIG. 2 is much less than the water in stream 24. A similar modification is the introduction of stream 35' directly into stream 72 instead of into mixer-settler 3. Using this operation, a slurry of potassium fluosilicate rather than fluosilicic acid solution is circulated through the barometric condenser and cooling tower.

In addition, the arrangement of electrodialysis units used for the concentration of the acid produced in the water splitting unit may be modified in any number of ways to achieve the desired result of concentrating hydrofluoric acid to a concentration greater than the azeotropic composition. Thus, while the process illustrated is basically a water-splitting and a three-stage concentration process, a single water-splitting stage may be used by itself or in combination with one or more electrolytic concentrating units if this is advantageous. The exact arrangement of electrodialysis units to be used depends in large measure upon the concentration difference which can be maintained in each unit and must be determined on the basis of the performance of the membranes chosen and the cost of electric power, electrodialysis equipment, and distillation. In general, as the number of stages is increased, the cost of electrodialysis apparatus and the electric power consumed increases, but the cost of distillation decreases because of the higher concentration of HF feeding the still.

The following examples are presented for the purpose of more fully illustrating the invention. It will be understood, however, that the invention is not intended to be limited to the specific concentration apparatus or mixtures recited. Rather, unless specifically set forth in the claims by way of limitation, it is intended that equivalents obvious to those skilled in the art are to be included within the scope of my invention.

EXAMPLE 1

An electrodialytic water-splitting cell consisting of a platinum anode, AMF C-100 *(*American Machine and Foundry Company) membrane, another AMF C-100 membrane, bipolar membrane, AMF A-100 *(*American Machine and Foundry Company) membrane, AMF C-100 membrane, and platinum cathode forming anolyte compartment, salt compartment, base compartment, acid compartment, salt compartment, and catholyte compartment, was used to determine parameters for the production of hydrofluoric acid and potassium hydroxide from potassium fluoride by electrodialytic water-splitting. The various compartments of the cell are connected to pumps and reservoirs. The volumes of the acid and base compartments were accurately determined and calibrated so that small changes in volume of these streams during the experiment could be determined.

Performance data were gathered, for example, by the following experiment. A 5 percent sodium sulfate solution was circulated in the anolyte and catholyte compartments. A 0.96 molar solution of hydrofluoric acid and a 0.65 molar sodium hydroxide solution were circulated in the acid and base compartments, respectively. After passing a direct current at 30 amperes/ft$^2$, the concentration of the hydrofluoric acid in the acid compartment increased to 1.19 molar while the concentration of base increased to 0.79 molar. Based upon these changes in concentration and the initial and final volumes of solutions 0.74 moles of acid and base were produced per faraday of current passed.

EXAMPLE 2

An electrodialysis cell consisting of platinum anode, AMF C-100 membrane, AMF C-100 membrane, AMF A-100 membrane, AMF C-100 membrane, and platinum cathode forming anolyte, dilute, concentrate, dilute, and catholyte compartments was used to determine important performance parameters for the electrodialytic concentration of HF. For example, a 2.5 percent sulfuric acid solution was circulated in the anolyte and catholyte chambers of the cell. A 44 percent HF solution was circulated in the dilute chambers of the cell. The concentrate chamber, which was in such a configuration that any volume increase caused an overflow into a tared collection vessel, was charged with 47.7 percent HF solution. A direct current of 300 amp./ft.$^2$ of membrane was passed at 25°–30°. As aqueous HF was delivered into the concentrate collection vessel, its concentration and weight were determined. From the number of faradays of current passed, the concentration and weight of the concentrate, the current efficiency could be found. The concentration of the dilute stream was also determined at intervals during the experiment by sample withdrawal and filtration. The concentration of the dilute stream decreased to 39.0 percent. The concentration of the concentrate stream varied smoothly with time reaching a maximum of 49.4 percent, then falling to 48.7 percent. The change in concentration of the concentrate stream with time reflects the change in the concentration of solution being transported. As the concentration of the dilute stream decreases the concentration transported also decreased. At the point of maximum concentration of the concentrate, the concentration being transported is the same as the concentration of the concentrate stream. The concentration of the dilute stream at the point where the concentration of the concentrate was at a maximum was 40.6 percent. A constant dilute feed of 40.6 percent, therefore, would result in a concentrate of 49.4 percent. The average current efficiency for this experiment was 1.96 based upon moles of HF transferred to concentrate/faraday of current passed. Similar experiments at various concentrations and current densities enable one to construct a function giving the maximum concentration attainable from a given concentration of HF in the dilute stream for various current densities, membrane types, temperatures, etc. This function of dilute versus concentrated streams permit the design of a multistage electrodialytic concentration process to obtain HF at concentrations greater than the azeotrope.

From additional runs using AMF A-100 and C-100 membranes at 25°–30° as performed in this example, it was shown that the multistage concentration depicted in FIG. 1 could be performed with the mass and composition of the streams as listed in Table I.

TABLE I

| Stream | Weight (tons/day) | Wt. % HF |
|---|---|---|
| 42 |  | 8 |
| 44 |  | 8 |
| 45 | 281.0 | 8 |
| 47 | 291.0 | 10 |
| 50 | 337.2 | 10 |
| 51 | 46.2 | 10 |
| 52 | 56.2 | 26 |
| 53 | 128.3 | 26 |
| 54 | 82.1 | 35 |
| 55 | 72.1 | 26 |
| 56 | 148.8 | 35 |
| 57 | 66.7 | 35 |

TABLE I-Continued

| Stream | Weight (tons/day) | Wt. % HF |
|---|---|---|
| 58 | 86.7 | 38 |
| 59 | 43.1 | 38 |
| 60 | 43.6 | 38 |
| 61 | 76.7 | 43.5 |
| 62 | 20.0 | 48 |
| 63 | 53.6 | 49.6 |
| 64 | 33.6 | 50.5 |
| 65 | 10.0 | 100 |

Based on this mass balance and the experimentally observed current efficiencies of approximately 2.0 moles/faraday throughout the range of concentrations listed, the size and current density used for each of the electrodialytic concentration units are calculated to be those given in Table II.

TABLE II

| Unit | Area (ft$^2$) | Current Density (amp/ft$^2$) |
|---|---|---|
| 10 | 2470 | 150 |
| 11 | 2440 | 300 |
| 12 | 2810 | 300 |
| 13 | 1490 | 300 |
| 14 | 840 | 300 |

EXAMPLE 3

With rapid stirring, 220 parts of 1M KOH was added slowly to 1,000 parts of 1.44 percent $H_2SiF_6$ solution. The amount of KOH solution added was sufficient to cause conversion of $H_2SiF_6$ to $K_2SiF_6$, but insufficient to carry the conversion to KF and $SiO_2$. The pH of the resultant solution was about 3.5. The precipitate formed was allowed to settle for 15 minutes. During this time the precipitate slurry settled to one-tenth its original volume, the supernatant being perfectly clear and free of any precipitate. The slurry filtered rapidly with Whatman No. 41 filter paper on a 7-cm dia. Buchner funnel yielding a perfectly clear filtrate and 29 g. of wet filter cake. After drying, 20 parts by weight of the precipitate was obtained which is essentially the theoretical amount taking into account solubility losses.

EXAMPLE 4

A slurry of $K_2SiF_6$ was prepared exactly as in Example 3. The slurry had a volume of 300 parts. The slurry was placed in a heating bath at 60° and 430 parts of 1M KOH was added along with a drop of phenolphathlein indicator solution. The pink color was discharged in <10 minutes. An additional 10 parts of 1M KOH was added. The pink color persisted. After 15 minutes, the slurry was vacuum filtered on a 9 cm. Whatman No. 41 filter paper, then rinsed with 100 parts of water. The filtrate was evaporated to dryness and yielded 31 parts of KF. The precipitate had a dry weight of 5.5 parts.

The invention has been described herein by reference to preferred embodiments. It will be understood, however, that variations from the specific details provided may be made without departing from the essence of the invention as set forth in the appended claims.

What is claimed:

1. A process for converting aqueous fluosilicic acid stream to aqueous hydrofluoric acid by reacting fluosilicic acid with a base to produce fluoride salt, and introducing said salt to electrodialytic water-splitting to yield aqueous hydrofluoric acid.

2. The method of claim 1 wherein said aqueous hydrofluoric acid is concentrated by electrodialysis above the concentration of the azeotrope and thereafter recovering anhydrous hydrofluoric acid by distillation.

3. A process for converting fluosilicic acid in an aqueous stream to aqueous hydrofluoric acid which comprises reacting said stream with potassium hydroxide from an electrodialytic water-splitter to produce potassium fluosilicate, liberating potassium fluoride from the potassium fluosilicate by reaction with potassium hydroxide from an electrodialytic water-splitting to produce potassium fluoride, and further treating said potassium fluoride in an electrodialytic water-splitter to produce aqueous hydrofluoric acid and potassium hydroxide.

4. A process for recovering fluorine values from waste gases formed into an aqueous effluent, said gases resulting from the treatment of phosphate rock with a strong acid and containing silicon tetrafluoride and hydrogen fluoride, the steps comprising precipitating potassium fluosilicate, reacting said potassium fluosilicate with potassium hydroxide from an electrodialytic water-splitter to produce aqueous potassium fluoride, separating said aqueous potassium fluoride from the precipitated silica, electrodialytically water-splitting said potassium fluoride to produce hydrofluoric acid, concentrating the hydrofluoric acid by electrodialysis to a concentration of at least 38 percent, and recovering the anhydrous hydrogen fluoride by distillation.

5. A process for recovering fluorine values from waste gases introduced into an aqueous effluent, said gases resulting from the treatment of phosphate rock with a strong acid and containing silicon tetrafluoride and hydrogen fluoride, the steps comprising precipitating a fluosilicate salt with a hydroxide base, reacting said fluosilicate salt with a hydroxide base, said base being produced in an electrodialytic water-splitter to produce an aqueous fluoride salt, separating said aqueous fluoride salt from the precipitated silica, electrodialytically water-splitting said fluoride salt to produce hydrofluoric acid, and concentrating the hydrofluoric acid by electrodialysis to a concentration of greater than 38 percent and recovering substantially anhydrous fluoride by distillation.

* * * * *